United States Patent [19]
Conforti et al.

[11] Patent Number: 5,063,781
[45] Date of Patent: Nov. 12, 1991

[54] FIBER-OPTIC VIBRATION SENSOR

[75] Inventors: Giuliano Conforti, Florence; Andrea A. Mencaglia, Siena; Mario Brenci, Pistoia; Anna G. Mignani, Florence, all of Italy

[73] Assignee: Consiglio Nazionale Delle Ricerche, Rome, Italy

[21] Appl. No.: 389,189

[22] Filed: Aug. 3, 1989

[30] Foreign Application Priority Data

Aug. 12, 1988 [IT] Italy ............................ 9468 A/88
Mar. 1, 1989 [IT] Italy ............................ 9355 A/89

[51] Int. Cl.$^5$ ............................................. G01H 9/00
[52] U.S. Cl. ................................ 73/651; 73/517 R; 73/653; 250/227.29
[58] Field of Search ............. 73/653, 651, 655, 517 R; 250/227.21, 227.28, 227.29

[56] References Cited

U.S. PATENT DOCUMENTS

| | | | |
|---|---|---|---|
| 4,185,503 | 1/1980 | Saito | 73/653 |
| 4,493,212 | 1/1985 | Nelson | 73/517 R |
| 4,581,528 | 4/1986 | Brogardh et al. | 73/655 |
| 4,649,271 | 3/1987 | Hok et al. | 73/517 R |

*Primary Examiner*—John E. Chapman
*Attorney, Agent, or Firm*—McGlew & Tuttle

[57] ABSTRACT

The sensor comprises a vibrating sheet (1), mechanically connected to the body (5A) to be analyzed, and an optical triangulation recording system for recording the displacements of the movable part of the sheet, in particular the free end (1B) opposite to that which is restrained. The recording system comprises two optical fibers (7, 9) ending in microlenses (10, 12) having optical axes mutually inclined and converging in the movable part (1B) of the sheet.

12 Claims, 3 Drawing Sheets

FIBER-OPTIC VIBRATION SENSOR

FIELD AND BACKGROUND OF THE INVENTION

The resistance to shocks and to vibrations are parameters which are indispensable for characterization of the mechanical resistance of materials, instruments and apparatuses of all kinds. When the object being tested is of small or medium dimensions, it is tested on appropriate "vibration and shock tables", but when the dimensions are considerable it is necessary to install appropriate sensors at one or more points of the apparatus. This takes place when it is also required to monitor continuously, during normal operation, the condition of vibrations of a given apparatus, for example in vehicles and in electrical and electromechanical machines. For this purpose, use is generally made of electromechanical transducers of various types, such as those of the piezoelectric, capacitive and electrodynamic type.

However, there are particular situations in which such conventional sensors are subject to certain limitations associated with the "hostility" of the working environment. For example in the case of electrical machines, precisely at the points at which it proves useful to perform monitoring, intense electromagnetic fields are present, which may falsify the recording of the vibration parameters or which at any rate may give rise to undesired interferences with the electrical signals or even cause problems concerning the electrical insulation, on account of particularly high voltages.

SUMMARY AND OBJECTS OF THE INVENTION

In view of these particular applications, according to the present invention there is proposed a vibration sensor based on the use of a vibrating member and a method of optical detection and using optical fibers for connection with the electronic control unit. The sensor may thus be made completely from dielectric material (glass or plastic) so as to ensure perfect insulation and complete insensitivity towards electromagnetic fields, even high-frequency ones. Furthermore, the control unit may be situated even at a great distance (i.e. kilometers) from the sensor itself.

The sensor which is the subject of the invention is based more particularly on the optical detection of the movement of a vibrating sheet. The sheet has one end integral with the casing of the sensor, in turn fixed onto the vibrating body being analyzed, while the other free end moves, with respect to the body of the sensor, according to the law of forced oscillations, which are induced by the end fixed to the body being examined. The movement of said end of the sheet is detected by means of an optical triangulation system realized by means of two optical fibers ending in two cylindrical microlenses with a refractive index gradient (GRIN), integral with the body of the sensor. The use of this optical trianqulation system, allows resolution of the order of micrometers.

Therefore the vibration sensor according to the invention substantially comprises a vibrating sheet, mechanically connected to the body to be analyzed, and a fiber-optic optoelectronic system for recording the displacements of the movable part of the sheet.

In practice, the sheet is restrained at one end and the recording system monitors the other free end thereof.

Although a system with a single fiber is also possible, the recording system is advantageously an optical triangulation system with two optical fibers ending in microlenses having optical axes mutually inclined and converging in the movable part of the sheet. The microlenses may be of the cylindrical type with a refractive index gradient (graded index lens or GRIN).

In certain cases it is advantageous that the sheet be made so as to enter into resonance at a particular frequency value which occurs in the body to be analyzed. For examining parts of alternating-current electrical machines, the sheet may therefore be made so as to enter into resonance at a frequency value determined by the value of the mains or supply frequency.

One of the main applications of the sensor in question consists in remote monitoring of the vibrations in parts of electrical machines, such as for example stators of large alternators, high-voltage transformers, power motors, and the like, for the purpose of both characterizing the machine and monitoring its operation, in order to intervene in good time in the event of abnormal amplitude of the vibrations. In all these applications, the following special properties of the sensor are essential, these properties being present in the sensor in question:

1) Manufacture of the probe throughout using dielectric material (plastic, glass). This enables the probe to operate even in particularly hostile environments, and in particular in the presence of strong electric and magnetic fields present in electrical machines, also ensuring optimum insulation.

2) Optical operation and hence immunity to electromagnetic interference, also and in particular along the section from the probe to the electronic control unit.

3) Detection of the amplitude and frequency of the vibrations even at a great distance from the sensor, obtainable in particular owing to the low attenuations of the optical fibers.

4) Possibility of manufacturing sheets which resonate at the vibration frequency of the machine (100 or 120 Hz), thus exploiting the mechanical amplification of the vibrations in the sheet and thus also raising the sensitivity to a fraction of a micrometer.

5) Small dimensions (of the order of a few $cm^3$) and low weight (of the order of a few grams), as well as compactness, robustness and hermeticity, which allow the sensor to be used even in locations which are difficult to gain access to.

Owing to the high degree of sensitivity and the other features mentioned above, the sensor may be used also in many other applications such as for example land and sea seismography.

For applications in the analyses of electrical machines which operate using alternating current, it is advantageous to manufacture a sensor which exploits resonance phenomena and is suitable for measuring vibrations at a fixed frequency of 100 (or 120) Hz, since such is the frequency of the main vibration mode of an electrical machine at the mains frequency of 50 (or 60) Hz.

If the sensor is applied to bodies (e.g. electrical machines) which are subject to high temperature variations, in order to limit or even eliminate the influence of temperature variations on the monitoring, a sensor can be provided, wherein the body or support of the sensor is constructed of material having a high coefficient of thermal expansion, and wherein said vibrating element is applied to said body or support in such a manner that the movements of the vibrating element which are induced by the thermal expansions of the body or support take place in a direction substantially coincident with the direction of the movements of said vibrating element which are induced by the vibration of the body to which the sensor is applied.

With a sensor of this type and using a particular signal processing mode, which will be described in detail hereinafter, the monitoring and recording can be made independent of temperature variations.

The invention relates also to a method for recording of vibrations of a body or, more generally, of a physical system. The method of the invention is substantially characterized in: that a vibrating element is mechanically connected to the system on which the vibration measurement is to be carried out; that a beam of electromagnetic radiation incident on said element vibrating with the body on which the measurement is to be carried out, is deflected by the surface of said element and collected in order to generate a signal which is a function of the position of said vibrating element, modulated by said vibration; and that said signal is recorded by recording means and processed in order to determine the parameters relating to the vibration to be measured.

The signal obtained can be processed in different ways, in particular depending on the desired accuracy. For example, if there is no need for a high degree of accuracy, the signal may be approximated by a function, of the first degree, of the position of the vibrating element. If a higher degree of accuracy is required, there can be used a method for the recording of vibration of the above mentioned type, wherein the recorded signal is approximated by a function, which is at least of the second degree, of the position of said vibrating element; wherein said function is expanded in a Fourier series at least to the second harmonic; and wherein the amplitude of the vibration of the vibrating element is determined as a function of the coefficients of the harmonic components of the Fourier series expansion of the recorded signal.

Further particularly advantageous ways of carrying out the method of the invention are set out in the attached dependent claims.

A further subject of the invention is a device for the recording of vibrations, of a body, an apparatus or a physical system. According to the invention, said device comprises: a sensor having a body to be applied fixedly to the body or system on which the recording is to be carried out; a vibrating element attached to said body; a fiber-optic system for the emission of a beam of electromagnetic energy incident on a portion of said vibrating element and for the recording of a beam of electromagnetic energy deflected by said vibrating element; and an optoelectronic system comprising means for the generation of said beam of electromagnetic energy incident on said vibrating element, and means for the recording of said beam of electromagnetic energy deflected by said vibrating element.

Further embodiments of the device according to the invention are set out in the dependent claims.

A further subject of the invention is the use of a sensor of vibrations—comprising a vibrating element mechanically connected to the body on which the recording is to be carried out, and a fiber-optic optoelectronic system for the recording of the movements of the movable part of the vibrating element—for the determination of the local temperature of the body on which the recording is to be carried out.

By using a function of the second degree for approximating the detected signal, in addition to the advantage of obtaining a result which is not influenced by the temperature, the possibility is also obtained of measuring the local temperature of the body subjected to the recording. In fact, the position of the vibrating element is a function both of the time on account of the vibration induced by the body to which the sensor is applied, and of the temperature of the body which causes a thermal deformation of the sensor. Moreover, the amplitude of the oscillation of the vibrating element is a function of the amplitude of the forcing vibration, that is to say of the vibration of the body to which the sensor is applied. Using a second-degree function in the variable represented by the position of the vibrating element with respect to the optical recording system, it is possible to obtain the amplitude of the forcing oscillation independently of the temperature, that is to say isolating the term of movement induced by the thermal expansion. Contemporaneously, with the method of the invention it is also possible to determine said term of movement induced by the thermal expansion independently of the parameters of oscillation of the vibrating element. From the movement value it is possible to proceed to the temperature value. The only condition for the recording of the temperature to be possible is that the body to which the sensor is applied, and thus the vibrating element, are actually in vibration.

The invention will be understood more clearly by referring to the description and accompanying drawing, which illustrates practical non-limiting examples of the said invention. In the drawing.

DETAILED DESCRIPTION OF THE PREFERRED EMBODIMENT

Figure 1:
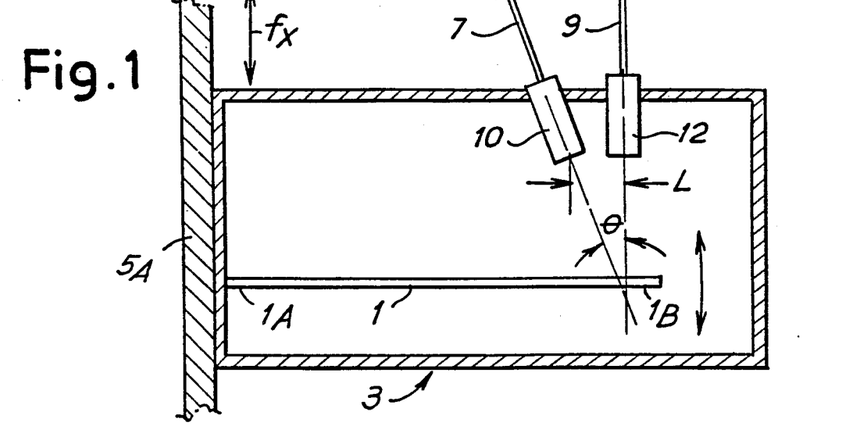
FIG. 1 shows a schematic diagram.

The operating principle of the sensor is illustrated in FIG. 1. A thin sheet 1, made of plastic material, is fixed by one end 1A so as to be restrained in the body 3 of the sensor, which is in turn rigidly fixed to the point 5A of the apparatus which is to be examined. As a result of the vibrations, in the direction fX normal to the plane of the sheet 1, the free end 1B of said sheet 1 oscillates at the same frequency and with amplitude proportional to the forcing vibration. An optical detection system comprises two multimode optical fibers 7 and 9 ending in respective cylindrical lenses 10 and 12 with a refractive index gradient (GRIN-rod) having axes mutually inclinded at the angle $\theta$ and converging in the region of the end 1B and one of the axes being approximately orthogonal to the sheet 1. The aforementioned optical system detects with good precision the instantaneous position of the end 1B of the sheet 1. One of the two fibers 7, 9 carries to the sensor (see FIG. 5 also) the infrared light generated by an LED 14, while the other one 9 collects the fraction of light diffused by the surface of the sheet 1, which proves to be a function of the position of said sheet and, with a good degree of approximation, proportional thereto in a certain range.

The choice of lenses 10, 12 of the GRIN-rod type (graded index lens) is dictated by requirements of compactness and of convenience of application to the fibers, but is obviously not binding as regards the operation of the sensor. A suitable optoelectronic system, situated at the other ends of the fibers, provides for the supply of the LED source 14, for detection of the light by means of a photodiode 16 and for processing of the signals, supplying the final results of the measurement, in terms of amplitude of vibration and if necessary frequency also. The value of the acceleration is obviously a direct consequence of the two aforementioned parameters.

Reference is made below, for the purposes of study, to: the sheet which constitutes the movable element; the optical system; and the optoelectronic unit.

In a simplified treatment, let x be the instantaneous deviation of the free end 1B of the sheet 1 with respect to the rest condition and with respect to the body 3 of the sensor. The equation of motion, relative to the variable x, may be written in the form:

$$\frac{d^2x}{dt^2} + w_0\mu \frac{dx}{dt} + w_0^2 x = \frac{d^2z}{dt^2} \tag{1}$$

where the symbols represent the following quantities:

z: the displacement of the body of the sensor 3 from the rest position (forcing term);

$w_o$: the free frequency of oscillation in the absence of the damping term;

$\mu$: the damping coefficient.

The parameters $w_o$ and $\mu$ may be expressed by means of two other parameters:

$w_1$: frequency of free oscillation, in the presence of the damping term;

$\tau$: time constant of the damping (time necessary for the amplitude of free oscillation to be reduced by a factor e).

It is easy to show that:

$$w_1 = w_0 \sqrt{(1 - \mu^2/4)} \tag{2}$$

$$\tau = 2/(w_0\mu)$$

from which the following is deduced:

$$\mu = 2/\sqrt{(w_1^2\tau^2 + 1)} \tag{3}$$

$$w_0 = \sqrt{(w_1^2 + 1/\tau^2)}$$

If the equation 1 is solved, it is found that the ratio G(w) between the amplitude of oscillation of the sheet and that of the forcing term (assuming a sinusoidal excitation) is given by:

$$G(w) = 1/\sqrt{[\alpha^4 - (2 - \mu^2)\alpha^2 + 1]} \tag{4}$$

w being the forcing frequency and $\alpha$ the ratio $w_o/w$.

The function G(w) exhibits a maximum if $\mu < \sqrt{2}$ (damping condition less than critical value) and at this maximum:

$$w = w_0/\sqrt{(1 - \mu^2/2)} \tag{5}$$

$$G_0 = 1/[\mu \sqrt{(1 - \mu^2/4)}]$$

When the damping coefficient is small:

$$G_0 \approx 1/\mu \tag{6}$$

$$G(w) \approx 1/\sqrt{[\alpha^4 - (2 - 1/G_0^2)\alpha^2 + 1]}$$

Furthermore:

$$G(w) \rightarrow 1 \quad \text{for } w \rightarrow \infty \tag{7}$$

$$G(w) \rightarrow (w/w_o)^2 \quad \text{for } w \rightarrow 0$$

Figure 2:
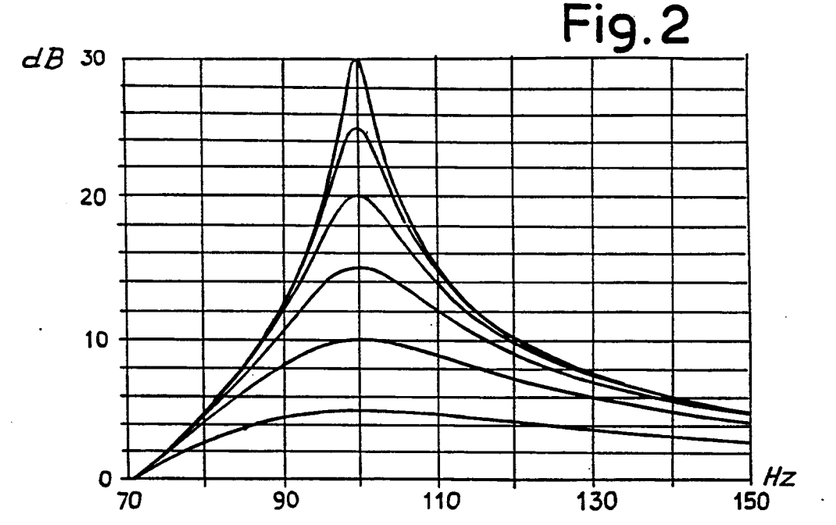
FIG. 2 shows a graph of the gain against the vibration frequency.

FIG. 2 shows a graph of the gain of the sheet (dB) as a function of the frequency of the vibrations, and illustrates a family of curves G(w) with $w_1 = 100$ Hz for various values of $G_o$ (30, 25, 20, 15, 10 dB). It is clear from the curves that for higher values of $G_o$ the bandwidth is smaller, which may make the system critical.

Figure 3:
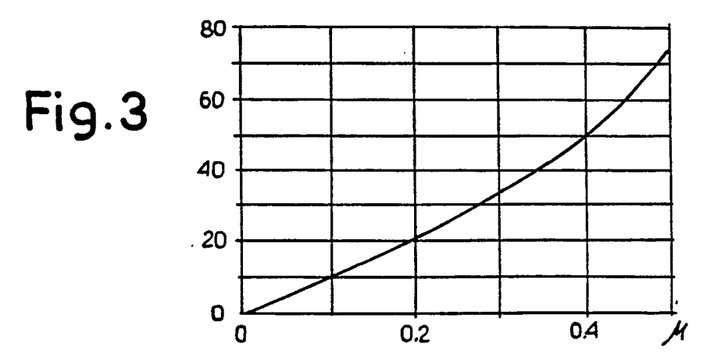
FIG. 3 shows a graph.

FIG. 3 shows the graph for the progression of the bandwidth (at 3 dB and in percent with respect to the resonance frequency) as a function of the damping coefficient $\mu$ represented as abscissae.

As already mentioned, the optical system proposed for recording the instantaneous position of the end 1B of the sheet 1, with respect to the body of the sensor, comprises the two multimode optical fibers 7 and 9 ending in two GRIN-rod microlenses 10, 12. Lenses known by the trademark SELFOC type SLW-1.8-0.25p-C-0.83 may be used, in a suitable container such as that called P-OPAL of N.G.S.; the abbreviation means that these are lenses with a 1.8 mm diameter, having a quarter pitch at a wavelength of 830 nm, and with antireflective treatment of the faces at this wavelength. The parameters which characterize such lenses are:

$n_0 = 1.599$ refractive index on the axis $\sqrt{A} = 0.332$ quadratic gradient constant This results in a focal length f:

$$f = 1/(n_0 \sqrt{A}) = 1.8837 \text{ mm} \tag{8}$$

With $r_1$ (=100 $\mu$m) being the radius of the core of the fiber and $\theta_1$ (=11.5°=0.2 rad) the angle of acceptance, this gives:

$r_0 = f\theta_1 = 0.377$ radius of the circle illuminated by the fiber, on the exit face of the lens. (9)

$\theta_0 = r_1/f = 3.04°$ divergence of the beam leaving the lens.

It is possible to choose the two parameters L (L =distance between the centers of the external surfaces of the lenses 10 and 12) and $\theta$ of FIG. 1, so as to have a response curve of the system for recording the position which is best suited for the performances required. To this end, a configuration may be proposed, in which the two lenses have a smallest possible distance L, compatible with the overall dimensions of the alignment elements P-OPAL, and a fairly small angle $\theta$, so as to have a linear response range which is as wide as possible; for example, it is possible to choose:

$$L = 2.5 \text{ mm and } \theta = 13° \tag{10}$$

Figure 4:
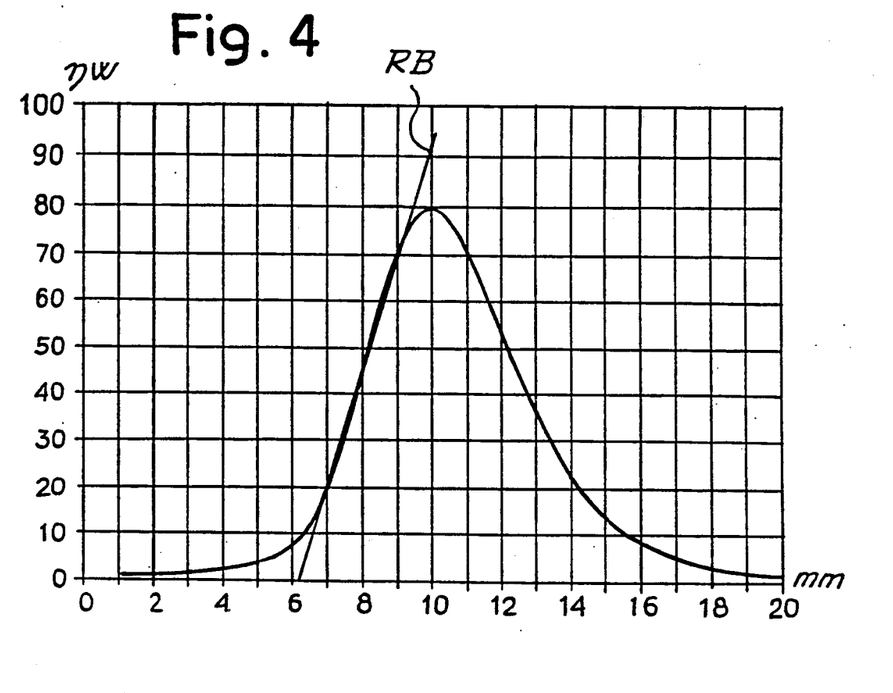
FIG. 4 shows a curve of the power collected by a lens.

FIG. 4 shows the curve of the power collected by a lens, as a response of the displacement sensor having the characteristics indicated above, measured with a screen consisting of Kodak paper which is 90% diffusing. The abscissae represent the distance (in mm) of the screen, i.e. of the surface of the sheet from the exit face of the lens parallel to the said screen, while the ordinates represent the power collected by a lens, while the other one is illuminated with 630 $\mu$W. It can be noted that at the maximum point the fraction of power collected is about 125 ppm.

The graph also shows a straight line RB, obtained by applying a best-fit over a range of 3 mm, centered at a distance of 8.15 mm. The good linearity in said range may be noted. A greater range may be obtained by sacrificing either the gain of the sheet or the linearity of the response, by lowering slightly the slope of the straight line. The straight line RB of FIG. 4 has a slope of about 25 nW/mm; therefore assuming it to be plausible that the detection system allows a resolution of at least 1 nW, there will be a resolution, with respect to the position of the sheet, of about 40 $\mu$m. Therefore with a gain of $G_o = 10$, it is possible to obtain a resolution of 4 $\mu$m with a linear dynamic range of 300 $\mu$m peak-to-peak.

In fact, however, the displacements of the sheet are not pure translatory movements, but are accompanied by small rotations. This involves a slight deviation from the graph of FIG. 4 and, more precisely, a reduction in power at both the ends of the segment. Within the limits of the linear approximation made by the best-fit, these deviations may be disregarded.

Figure 5:
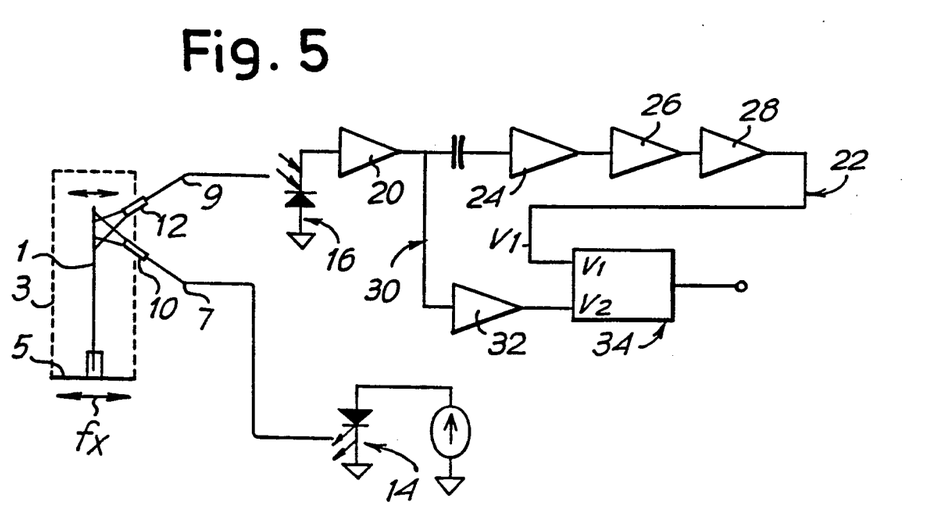
FIG. 5 shows a block diagram of an optoelectronic system.

With reference to the diagram of FIG. 5, I represents the current detected by the photodiode. Assuming that the working point lies on the straight line RB of FIG. 4 and if x is the deviation of the sheet from the optical system, this gives:

$$I = h(Ax + B) \tag{11}$$

where h is a coefficient which depends on the insertion losses of the entire optical system, or on the power injected into the fiber by the LED 14, on the losses due to the fibers 7,9 and any connectors, on the efficiency of diffusion of light of the sheet 1 and on the sensitivity of the photodiode 16. This coefficient, therefore, is subject to variations over time due, for example, to the forming of folds in the fibers, to disconnecting and subsequent reconnecting of connectors, to variations in emission of the LED. The constants A and B, however, are solely linked to the intrinsic response of the optical triangulation system and may be reasonably regarded as constant even over long periods of time.

If x varies over time, on account of the vibration of the sensor, following a sinusoidal law, or in any case in such a way that the mean value of x is constant, $<>$ being used to indicate the temporal mean value of a parameter, this gives:

$$<I> = h(A<x> + B) \tag{12}$$

and $$h = <I>/(A<x> + B) \tag{13}$$

and therefore:

$$x - <x> = \left[ <x> + \frac{B}{A} \right] \cdot \frac{I - <I>}{<I>} \tag{14}$$

If $\delta x$ is the amplitude of the oscillation which is to be measured and $\delta I$ the amplitude of oscillation of the current detected, this gives:

$$\delta x = k \frac{\delta I}{<I>} \tag{15}$$

when:

$$k = <x> + \frac{B}{A}$$

The equation (15) shows how it is possible to obtain the value $\delta x$ from the measurement of $\delta I$ and $<I>$, independently of the value of h, and therefore of any fluctuations in the losses of the optical system.

The circuit, shown in the form of a block diagram in FIG. 5, ensures processing of the signal detected by the photodiode 16 in accordance with the equation (15).

A transconductance preamplifier 20 effects conversion of the current on the photodiode into voltage. The output said amplifier is sent to two circuits: the first one 22, alternating-coupled, comprises a narrow-band active filter 24 (typically 1+5 Hz) centered on the vibration frequency of the sheet (100 Hz), which, owing to the selective amplification, improves substantially the signal/noise ratio. The output signal at 26 is rectified and integrated and controlled by a low-pass filter 28 so as to obtain a voltage $V_1$ proportional to the value $\delta I$ of the amplitude of the current detected. The second circuit 30, direct-coupled, comprises a low-pass filter 32 which supplies a voltage $V_2$ proportional to $<I>$. An analog divider 34, finally, —which receives the two values $V_1$ and $V_2$ —supplies a voltage proportional to the ratio $V_1/V_2$ and, therefore, in accordance with the equation (15), proportional to $\delta x$. Obviously the value of the constant k is fixed by means of calibration on the calibrated vibration table, regulating the amplification of the final circuit.

Using the abovementioned criteria, it is possible to make fiber-optic sensors also having performances different from those taken into consideration. For example it is possible to design non-resonating and hence wide-band sensors, making the sheet operate at frequencies much greater than the resonance frequency and thus obtaining a flat response. Furthermore, the signal processing circuit may be more sophisticated so as to be able to perform linearization of the response of the sensor in a wider range than that "fitted" by the straight line of FIG. 4.

Manufacture of the resonating sheet requires particular attention, both with regard to the influence of the temperature on the resonance frequency and with regard to the dimensions. In particular, if a very small sensor is to be made, a very thin sheet must be used.

The above mentioned considerations do not take into account possible thermal expansions of the body on which the sensor is applied, and of the sensor itself. These thermal expansions are not always negligible. In the following considerations, which are a further development of what has been discussed hereinabove, it will be shown that—according to said further development of the method of the invention—it is possible to take into account the influence of temperature on the vibration measurement. It will also be shown that it is possible to determine a temperature value starting from the detection of vibrations by mathematically processing the data detected by the sensor, so that the same sensor can be used both for vibration measurement as well as temperature measurement.

If the temperature influence is to be taken into consideration, assuming a sinusoidal progression of the forcing term, with an amplitude of oscillation $Z_0$, the solution of the differential equation (1) may be written in the form:

$$x(t)=x_0(T)+x_1 \cos(wt) \quad (16')$$

in which the symbols represent the following quantities:

$x_0$: the movement in the direction x of the sheet as a function of the temperature T of the body 3 of the sensor. This term may be relevant in the measurement and may be incremented by an appropriate choice of the materials of the sensor;

$x_1$: the amplitude of the cosinusoidal oscillation of the sheet 1;

w: the oscilation frequency of the forcing term.

The amplitude of the oscillation of the sheet is expressible also in the form:

$$x_1 = Z_0 \cdot G(W)$$

where G(W) is the mechanical gain of the sheet, which proves to be a function of the pulsatance or oscilation frequency W of the forcing term and of the damping coefficient $\mu$. In the graph of FIG. 2 the progression of G(W) is shown as a function of the frequency, expressed in Hz of the forcing term, for a family of curves which are expressed in parametric terms as a function of $\mu$. Introducing the mechanical gain G(W) of the sheet, the equation (16') may be written in the form $$x(t)=x_0(T)+Z_0 \cdot G(w) \cdot \cos(wt) \quad (16)$$

By recording the movements x of the end 1B of the sheet 1, it is thus possible to have information both on the parameters which characterize the vibration of the apparatus to which the sensor is applied (that is to say the parameters $Z_0$, W), and on the parameters of temperature of the apparatus. For this purpose, use is made of the optical system which has already been briefly described, comprising the optical fibers 7, 9 and the lenses 10, 12 having a refractive index gradient. The optical system is characterized not only by the specific parameters of the lenses (refractive index on the axis and quadratic gradient constant) and by the characteristics of the fiber (angle of acceptance and radius of the core), but also by the parameters L and $\theta$ indicated in FIG. 1, that is to say by the distance between the centers of the external surfaces of the lenses 10, 12 and by the angle $\theta$ between the axes of the two lenses. These two parameters may be chosen in such a manner as to have a response curve of the system for recording the position which is better matched to the advantages required. To this end, the following may be assumed by way of example:

$$L = 2.5 \text{ mm and } \theta = 13°.$$

Figure 6:
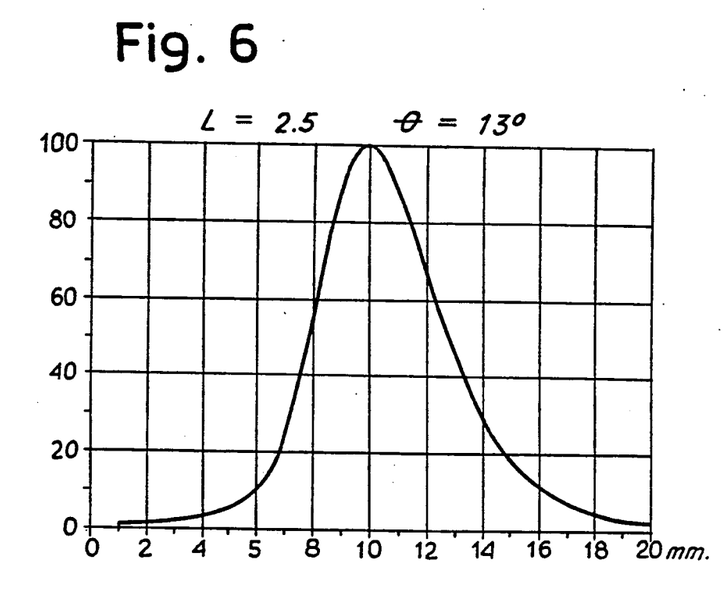
FIG. 6 shows a graph similar to that of FIG. 4 in a modified configuration.

FIG. 6 shows the curve of the power as a function of the distance x of the sheet from the exit face of the lens parallel to said sheet, collected by a lens as response of the movement sensor having the characteristics set forth hereinabove, measured by a screen formed of Kodak paper which is 90% diffusing. The curve was obtained by using GRIN-rod microlenses of the type known by the trademark SELFOC type SLW-1.8-0.25p-C-0.83 and with optical fibers having a radius of the core $r_1$ equal to 100 $\mu$m and angle of acceptance $\theta_1$ equal to 0.2 rad.

As is evident from the graph of FIG. 6, when x(t) is included within the range 8-10 mm, the curve may be approximated with good precision by a second-order function, and in particular by a parabola. In such an approximation, the current recorded by the photodiode 16 of the optoelectronic system can be expressed in the form:

$$I = C(-Ax^2 + Bx - 1) \quad (17)$$

where A, B, C indicate the parameters of the parabola.

Introducing the equation (16) into the equation (17), what is obtained, by carrying out a Fourier series expansion to the second harmonic, is the following expression for the current detected by the photodiode:

$$I = I_0 + I_1 \cdot \cos(wt) + I_2 \cdot \cos(2wt) \quad (18)$$

where the coefficients $I_0$, $I_1$, $I_2$ are expressed by:

$$I_0 = C(-A(x_0^2 + \tfrac{1}{2}x_1^2) + Bx_0 - 1)$$

$$I_1 = C \cdot x_1 \cdot (-2Ax_0 + B) \quad (19)$$

$$I_2 = \tfrac{1}{4} C \cdot A \cdot x_1^2$$

The system (19) of three equations may be solved by eliminating the term C and finding $x_0$ and $Z_0 = x_1/G(w)$, thus obtaining the following:

$$x_o = \frac{B}{2A} + \frac{(2(B^2 + 4A))^{\frac{1}{2}}}{8A} \cdot \frac{I_1}{(I_2^2 + I_0 I_2 + I_1^2/8)^{\frac{1}{2}}} \quad (20)$$

$$Z_o = \frac{1}{G(w)} \cdot \frac{(2(B^2 + 4A))^{\frac{1}{2}}}{2A} \cdot \frac{I_2}{(I_2^2 + I_0 I_2 + I_1^2/8)^{\frac{1}{2}}} \quad (21)$$

Accordingly, from the measurement of the coefficients $I_0$, $I_1$, $I_2$ of the current signal corresponding to the optical signal recorded by the optical system 7, 9, 10, 12 it is possible to find, independently of one another, the terms $x_0$ and $Z_0$, that is to say the value of the thermal expansion (proportional, to a good approximation, to the temperature) and the amplitude of the forcing oscillation.

As is evident from the equation (21), the amplitude of the forcing oscillation is not influenced by the temperature parameter (that is to say by the thermal expansion of the sensor), but is entirely determined by the measurement of the coefficients $I_0$, $I_1$, $I_2$ of the Fourier series expansion of the signal I recorded and by the parameters A and B which, being intrinsic parameters of the sensor, may be determined in a calibration phase.

Similarly, the value $x_0$ is determinable as a function of the intrinsic parameters A and B of the sensor, and from the measurement of the three harmonic components. The measurement of $x_0$ is independent of the parameters $Z_0$, w of the forcing term. The function $x_0(T)$ is generally linear, but in all cases it is always possible to determine its progression by an appropriate standardization.

On the basis of equations (20) and (21), it is thus possible in the first place to undertake a measurement of the parameters of vibration independently of the temperature and without errors induced by the variation of the latter, and in the second place it is possible-where required-to determine the temperature of the apparatus under examination at the point of application of the sensor.

The sensor and the pertinent method of recording may be used in accordance with a wide variety of modes, obtaining results which are very reliable and are not influenced by external factors such as, for example, constant or variable electric and/or magnetic fields, decline of the recording and measurement system, and fluctuations of the optical power of the emitter. When the resonance frequency of the sheet is very high in comparison with the frequency of the forcing term, the sensor may be used as an accelerometer. In fact, under these conditions the function $G(w)$ is approximately proportional to the ratio $(w/w_0)^2$, where $w_0$ is the resonance pulsatance of the sheet 1. Accordingly, on differentiating the equation (21) twice with respect to time, the following is obtained:

$$a_o = K \cdot \frac{(2(B^2 + 4A))^{\frac{1}{2}}}{2A} \cdot \frac{I_2}{(I_2^2 + I_0 I_2 + I_1^2/8)^{\frac{1}{2}}} \quad (22)$$

with K=constant. Under these conditions, accordingly, the sensor can record the acceleration of the body to which it is applied.

It should be noted that from the system (19) it is possible to eliminate the term C which, as emerges from the equation (18), is dependent upon a multiplicity of factors, such as the attenuations of the optical system (folding of the fibers, fluctuations of the source, connectors, diffusivity of the sheet, losses of optical power injected into the system etc.) which may vary with time. Accordingly, the equations (20) and (21) on the basis of which the measurements of vibration and/or of temperature are carried out contain only the parameters A and B and the function $G(w)$ which, once the optoelectronic recording system and the characteristics of the sensor have been defined, remain strictly constant with time.

Figure 7:
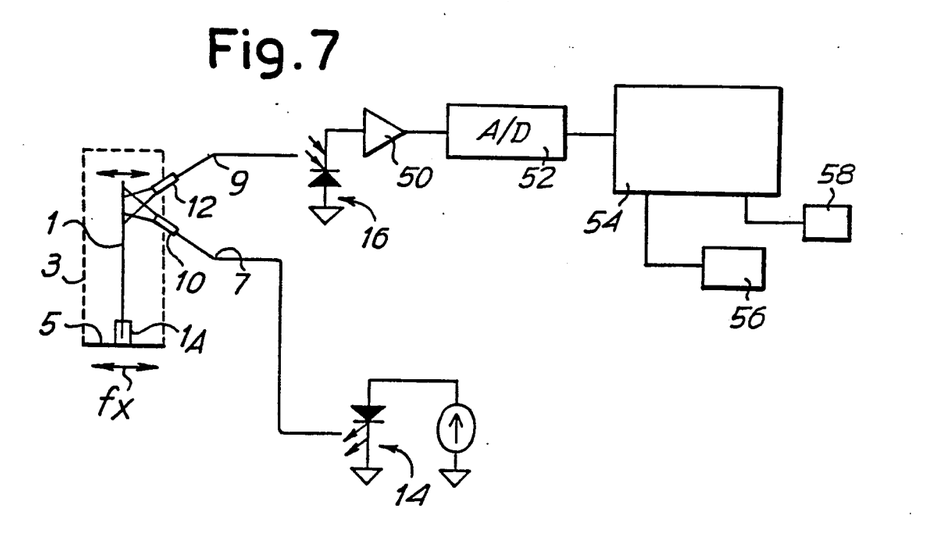
FIG. 7 shows a modified embodiment of the device of the invention.

FIG. 7 shows a block diagram of a possible embodiment of an optoelectronic system for the recording of the parameters of vibration and/or temperature by the method which has been disclosed above. As evident in said FIG. 7 the current signal recorded by the photodiode 16 is passed to an amplifier 50 which effects the conversion of the current signal into a voltage signal. The voltage signal is then passed to an analog/digital converter 52 which converts the signal into digital form in order to pass it to a processor 54 which is appropriately programmed to carry out the Fourier transformation of the digital signal obtained by transformation of the current signal recorded by the photodiode 16, obtaining the harmonic components $I_0$, $I_1$, $I_2$ of the recorded signal and the relative pulsatance w. Based on these values recorded and on the values of the parameters A, B and of the function $G(w)$ which are determined by standardization and stored in memory, the processor 54 determines, based on the equations (20) and/or (21), the value of the temperature T of the apparatus under examination and/or the amplitude $Z_0$ of the forcing term. The result of the processing may be displayed by means of peripherals 56, 58 on video and/or on printer, depending upon the requirements. It should be noted that, in some cases, the value of w is known; this is applicable, for example, in the applications to electrical machines, where the pulsatance of the mechanical vibrations is equal to twice the mains or supply.

It is evident that the processing of the signal recorded by the photodiode 16 may also take place by analog means or by digital means using an appropriate digital circuit which undertakes the same operations as the processor 54 undertakes by means of appropriate programming.

We claim:

1. A vibration sensor, comprising; a vibrating element in the form of a sheet restrained at one end and having an opposite free end, said free end including diffusion means for receiving incident light radiation, and for sending back reflected rays, of said incident light radiation in a multiplicity of directions; optical fiber means for recording the displacement of the movable part of the vibrating element, said optical fiber means including an optical triangulation system with a first optical fiber and a second optical fiber each of said optical fibers ending in microlenses, said optical fibers having optical axes mutually inclined and converging at said diffusion means of said vibrating element.

2. The vibration sensor as claimed in claim 1 wherein the microlenses are of the cylindrical type with a refractive index gradient (graded index lens or GRIN).

3. The vibration sensor as claimed in claim 1, wherein the vibrating element is made so as to enter into resonance at a particular frequency value which occurs in the body to be analyzed.

4. The vibration sensor as claimed in claim 3, for examining parts of alternating-current electrical machines, wherein the vibrating element is made so as to enter into resonance at a frequency value determined by the value of the supply frequency.

5. The vibration sensor as claimed in claim 1, wherein the vibrating element is connected with one of its ends to a support or body, constructed of material having a high coefficient of thermal expansion and wherein said vibrating element is applied to said body or support in such a manner that the movements of said vibrating element which are induced by the thermal expansions of said body or support take place in a direction substantially coincident with the direction of the movements of said vibrating element which are induced by the vibration of the body to which the sensor is applied.

6. A device for the recording of vibrations, characterized by: a sensor having a body to be applied fixedly to the body or system on which the recording is to be carried out; a vibrating element including a diffuse reflector surface which is substantially 90% diffusing, said vibrating element being attached to said body; a fiber-optic system for the emission of a beam of electromagnetic energy incident on a portion of said vibrating element, including said diffuse reflector surface, and for the reception of a beam of electromagnetic energy diffusely reflected by said vibrating element; and an optoelectronic system, comprising means for the generation of said beam of electromagnetic energy incident on said vibrating element, and means for the recording of said beam of electromagnetic energy diffusely reflected by said vibrating element.

7. The device as claimed in claim 6, wherein the optoelectronic system further comprises means for the conversion of said recorded beam of elecromagnetic energy signal into a digital signal, and programmable means for the processing of the digital signal, including means for approximating the recorded signal by a function which is at least of the second degree, of the position of said vibrating element, means for expanding said function in a Fourier Series at least to the second harmonic and means for determining the amplitude of the vibration of the vibrating element as a function of the coefficient of the harmonic components of the Fourier Series expansion of the recorded signal.

8. A device according to claim 7, wherein said function is a second-degree function of the type $$I = C \cdot (-Ax^2 + Bx - 1)$$

where:

I = said recorded signal,
x = the position of said vibrating element,
c = a gain coefficient, and
A and B are parameters representing optical and geometrical characteristics of said fiber optic system.

9. A device according to claim 8, wherein the position (x) of the vibrating element is expressed by the equation: $x(t) = x_0 + Z_0 G(w) \cos(wt)$ where $x_0$ is a term which is a constant with respect to time (t) and w is the frequency of oscillation of the vibration to be measured and the recorded signal (I) is expanded in a Fourier Series to the second harmonic in the form $I = I_0 + I_1 \cos(wt) + I_2 \cos(2wt)$; and in which the coefficients $I_0$, $I_1$, $I_2$ of the Fourier series expansion are expressed by: $I_0 = C(-A(X_0^2 + \frac{1}{2} X_1^2) + Bx_0 - 1)$; $I_1 = C(x_1(-2Ax_0 + B))$; $I_2 = \frac{1}{2} CAx_1^2$ and are used for the determination of the amplitude ($Z_0$) of the vibration to be measured, based on the formula:

$$Z_0 = \frac{1}{G(w)} \cdot \frac{(2(B^2 + 4A))^{\frac{1}{2}}}{2A} \cdot \frac{I_2}{(I_2^2 + I_0 I_2 + I_1^2/8)^{\frac{1}{2}}}$$

where:

$Z_0$ = an amplitude of the vibration to be recorded,
G = a ratio between an amplitude of the vibrating element and $Z_0$, and
$X_1 = GZ_0$.

10. A device according to claim 9 wherein the term $x_0$ is determined on the basis of the equation:

$$x_0 = \frac{B}{2A} \cdot \frac{(2(B^2 + 4A))^{\frac{1}{2}}}{8A} \cdot \frac{I_1}{(I_2^2 + I_0 I_2 + I_1^2/8)^{\frac{1}{2}}}$$

the value $x_0$ being used for the determination of the temperature (T) of the vibrating element.

11. A vibration sensor, comprising; a vibrating element in the form of a sheet restraned at one end and having an opposite free end, said free end including diffusion means for receiving incident light radiation and for sending back diffused light of reflected rays of said incident light radiation in a multiplicity of directions; optical fiber means for recording the displacement of the movable part of the vibrating element, said optical fiber means including an optical triangulation system with a first optical fiber for emitting said incident light radiation and a second optical fiber for receiving a portion of said diffused light and transmitting the portion received, each of said optical fibers ending in microlenses, said optical fibers having optical axes mutually inclined and converging at said diffusion means of said vibrating element and electronic conditioning means for receiving only light transmitted by said second optical fiber and sensing movement of said vibrating element based on modulation of said light transmitted by said second optical fiber.

12. The apparatus according to claim 11 wherein said recorded displacement of the moveable part of the vibrating element is converted into a digital signal and processed by a programmed electronic processor.

* * * * *

UNITED STATES PATENT AND TRADEMARK OFFICE
CERTIFICATE OF CORRECTION

PATENT NO. : 5,063,781
DATED : November 21, 1991
INVENTOR(S) : Conforti, et. al.

It is certified that error appears in the above-indentified patent and that said Letters Patent is hereby corrected as shown below:

Title page, item [75], change the third named inventor to Massimo Brenci.

Signed and Sealed this

Twentieth Day of September, 1994

Attest:

BRUCE LEHMAN

Attesting Officer

Commissioner of Patents and Trademarks